(12) United States Patent
Bolognese et al.

(10) Patent No.: US 7,503,994 B2
(45) Date of Patent: Mar. 17, 2009

(54) PROCESS FOR THE PRODUCTION OF MULTILAYER POLYMER FILMS

(75) Inventors: Litterio Bolognese, Vasto (IT); Nicolino Vallese, Vasto (IT)

(73) Assignee: Pilkington Italia S.p.A., San Salvo CH (IT)

( * ) Notice: Subject to any disclaimer, the term of this patent is extended or adjusted under 35 U.S.C. 154(b) by 690 days.

(21) Appl. No.: 10/380,621

(22) PCT Filed: Oct. 5, 2001

(86) PCT No.: PCT/IT01/00510

§ 371 (c)(1),
(2), (4) Date: May 30, 2003

(87) PCT Pub. No.: WO02/28639

PCT Pub. Date: Apr. 11, 2002

(65) Prior Publication Data

US 2003/0183322 A1    Oct. 2, 2003

(51) Int. Cl.
*B32B 17/10* (2006.01)

(52) U.S. Cl. .................. 156/106; 156/309.9; 156/324

(58) Field of Classification Search .............. None
See application file for complete search history.

(56) References Cited

U.S. PATENT DOCUMENTS 2,757,711 A * 8/1956 Petry et al. ................. 442/326
3,718,535 A * 2/1973 Armstrong et al. .......... 428/339
3,982,984 A   9/1976 Baldridge
4,355,076 A * 10/1982 Gash ........................ 428/411.1
4,531,997 A *  7/1985 Johnston ..................... 156/498
4,910,074 A *  3/1990 Fukawa et al. .............. 428/215
4,973,511 A  11/1990 Farmer et al.
5,366,295 A * 11/1994 Montesissa et al. ......... 383/201
5,393,365 A *  2/1995 Smith ........................ 156/219
5,735,987 A *  4/1998 Boriani et al. .............. 156/176

FOREIGN PATENT DOCUMENTS

DE      34 45 199        12/1986
WO      WO 0046027        8/2000

* cited by examiner

Primary Examiner—Richard Crispino
Assistant Examiner—Barbara J. Musser
(74) Attorney, Agent, or Firm—Buchanan Ingersoll & Rooney PC

(57) ABSTRACT

A process for the production of a composite film for use in laminated glazing assemblies comprising at least one layer of a flexible safety film together with one layer of flexible plastic carrier film includes the steps of drawing the layers from separated feed rolls (1, 2), heating to a bonding temperature, and pressing together to form a composite film, whereby the flexible safety film is not under tension when it is pressed together with the carrier film to form the composite film.

11 Claims, 2 Drawing Sheets

PROCESS FOR THE PRODUCTION OF MULTILAYER POLYMER FILMS

Figure 1:
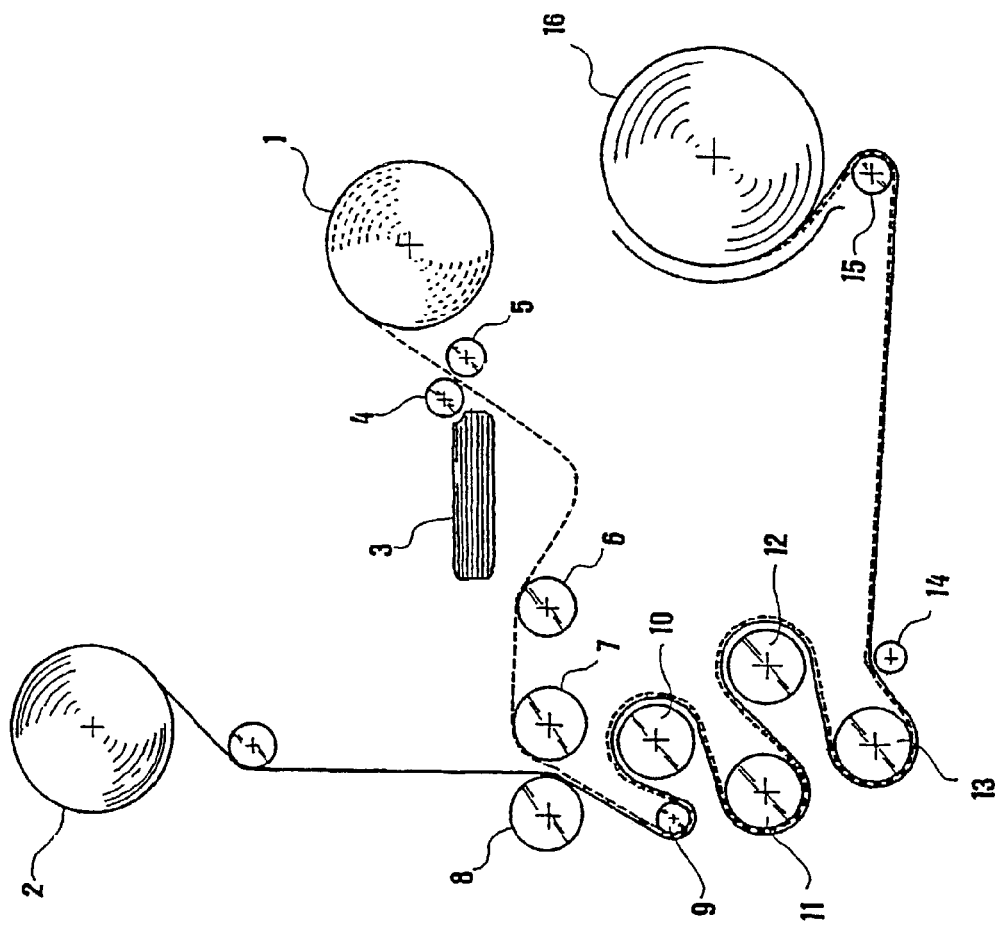

This invention relates to novel processes of the production of composite polymer films for use in laminated glazing assemblies and especially in glazings for use in automotives, to the films produced using such processes and to laminated glazings incorporating those films.

There is an increasing demand for glazings especially automotive glazing which combine solar reflecting properties with the appropriate safety properties. One type of product which is used to meet this demand comprises a laminated glazing having an interlayer which comprises a flexible plastic safety film such as polyvinylbutyral (hereinafter for convenience PVB) together with a flexible plastic carrier layer which has a solar control coating layer upon at least one of its surfaces. One typical flexible carrier material is polyethylene terephthalate (hereinafter for convenience PET).

Laminated glazing comprising such an interlayer may be produced by taking a first sheet of glass, the bottom sheet and placing successively on top of that sheet a sheet of flexible plastic safety film; a sheet of flexible plastic carrier film; a further sheet of flexible plastic safety film and a second glass sheet, the top sheet. The resulting stack may be formed into a laminated glazing using conventional techniques. However an operation of the type described above is time consuming and laborious and also increases the difficulties of removing air bubbles trapped between the various layers of the stack. For this reason it has been proposed, far example in U.S. Pat No. 4,973,511, to form a composite pre-laminated film comprising at least one layer of safety film and at least one layer of coated carrier film. Typically a layer of safety film and a layer of carrier film can be prelaminated to form a bilayer or a further layer safety film may be introduced to form a trilayer in which the carrier film is encapsulated by the two separate layers of safety film. International Patent Application WO 00/46027 describes a lamination machine useful in the production of a PVB/PET/PVB trilayer material which is free of wrinkles. In use the machine draws the PVB under tension through a heating zone where it is heated to a temperature at which it will bond to the PET and through a set of nip rollers where the PVB and PET films are laminated to form a trilayer material. The use of such composite pre-laminated films simplifies the production of the laminated glazing but can lead to other problems. The laminated glazings may have a wrinkled appearance, possibly in specific localised areas, which is not acceptable. A specific example occurs when a part of the carrier film is removed to provide a window in the solar control coating. Such a window may be introduced to provide a telepass area through which electromagnetic radiation may pass. Such glazings suffer from an increased tendency of the laminated glazing to have a wrinkled appearance especially in the proximity of the window in the solar control coating.

We have now discovered that composite films having a reduced tendency to wrinkle when subjected to a lamination process may be produced by allowing the PVB safety films to relax prior to incorporating them into a composite film. Conventional methods for the production of these composite films such as that illustrated in FIG. 5 of U.S. Pat. No. 4,973,511 and FIG. 1 of WO 00/46027 maintain the PVB under tension whilst it is passed from a feed roll to a nip roll where it is bonded with a PET film to form a composite film. In the processes of this invention the safety film is allowed to relax prior to drawing it through the nip roll whilst it is not under tension.

Accordingly from the first aspect this invention provides a process for the production of a composite film comprising at least one layer of a flexible safety film together with at least one layer of a flexible plastic carrier film wherein said layers are drawn from separate feed rollers, heated to a bonding temperature and pressed together to form a composite film which process is characterised in that the flexible safety film is not significantly stretched prior to its being incorporated into the composite film. In the preferred embodiments the flexible safety film is heated to a temperature which is higher than the bonding temperature prior to its being incorporated into the composite film.

Any of the safety films known to be useful in the production of conventional laminated windshields are potentially useful in the process of this invention. Polyurethanes, polyvinyl chlorides, polyvinylacetal and ethylene vinyl acetate are all potentially useful but the most widely used safety film is plasticised polyvinyl butyral (PVB). If only for reasons of its ready availability PVB is the preferred safety film to use in the processes of the invention.

The thickness of the safety film will vary according to the requirements or the design. Generally each layer of PVB will be at least 100 microns thick and usually no more than 2000 microns. The thickness will vary with the number of layers of PVB which are incorporated into the composite film. In the preferred embodiment wherein the composite film comprises a single layer of flexible plastic carrier encapsulated between two layers of safety film the combined thickness of the layers of safety film will typically be in the range 500 to 1000 microns. Most commonly the two layers of safety film will be of approximately equal thickness.

The flexible plastic carrier layer may also be formed from a variety of known materials such as PET, nylons, polyurethanes, polyacrylics, polycarbonates, polyolefins, cellulose acetate and polyvinyl chloride. The preferred material is PET.

The thickness of the flexible plastic carrier layer is not critical and will generally be in the range 25 to 100 microns. The PET may be provided with an infra red reflecting coating prior to the formation of the composite material or after the formation of the composite material. Suitable reflecting coatings may be deposited using a variety of techniques and materials. A preferred form of coating is a stack comprising alternative layers of a dielectric and a metal. Examples of suitable metals are silver, gold, palladium, chromium, aluminium, nickel, copper and steel. Examples of useful dielectrics include tin oxide, indium tin oxide, titanium oxide, zinc oxide, aluminium oxide, tungsten oxide, tantalum oxide and zirconium oxide.

The composite films of the type described above may conventionally be produced by heating at least one safety film and at least one carrier film to a temperature at which at least one of those films, normally the safety film, become tacky and pressing the films together to form a composite film which may conveniently be achieved by passing the films through a nip roller. The nip roller is adjusted to exert a sufficient pressure as to cause the films to bond together. This bonding need only be sufficiently strong to produce a composite film which can be handled and cut. The composite film can be used in a conventional laminating system. The safety film and the carrier film become strongly bonded during this lamination process.

In a preferred embodiment of the processes of this invention the safety film (or films) is heated to an elevated temperature during that part of the process when it is not under tension. Conveniently the film will be heated to a temperature slightly higher than that which is desired at the point where it is pressed to form the composite film. Typically a PVB safety film is pressed at a temperature in the range 60° C. to 70° C. In those preferred embodiments the PVB will preferably be heated to a temperature in the range 70° C. to 80° C. whilst not under tension and will cool by natural convection as it passes to the nip rollers. This heating of the safety film assists in the relaxation of the film and results in the production of composite films having a reduced tendency to wrinkle during the lamination process A typical prior art process is illustrated in FIG. 5 of U.S. Pat. No. 4,973,511 the relevant disclosures of which are hereby incorporated by reference. The process illustrated describes the production of a trilayer comprising a single layer of a carrier film (PET) encapsulated between two layers of a safety film (PVB). The PVB is taken from feed rollers 54*a* and 54*b* under tension to nip rollers 52 via tension roll 55. This results in a significant stretching of the PVB.

The preferred embodiment of the process for the production of a composite film which is a bilayer formed by pressing a PVB safety film and a PET carrier film is illustrated diagrammatically in FIG. 1. In FIG. 1 the numeral 1 represents a feed roller for the PVB film. 2 represents a feed roller for the PET film. 3 represents an infra red heater. 4 and 5 represent pinch rollers. 6 represents a spiral roller. 7 and 8 represent nip rollers. 9, 14 and 15 represent idler rollers and 10, 11, 12 and 13 represent cooling rollers. In use PVB is drawn from feed roller 1 by the pinch rollers 4. The temperature of the PVB is raised as it passes in front of infra red heater 3. The hot film passes aver spiral roller 6 which is operated so as to avoid any stretching of the PVB during its passage from pinch rollers 4 and 5 to spiral roller 6. The heated PVB film passes to nip rollers 7 and 8.

The PET film is drawn from feed roller 2 and passes to nip rollers 7 and 8 under tension. The PVB and PET films are pressed together between the rollers 7 and 8 to form a composite film. The composite film passes over idler roller 9 and cooling rollers 10, 11, 12 and 13 before being drawn over idler rollers 14 and 15 by the action of collecting roller 16.

Figure 2:
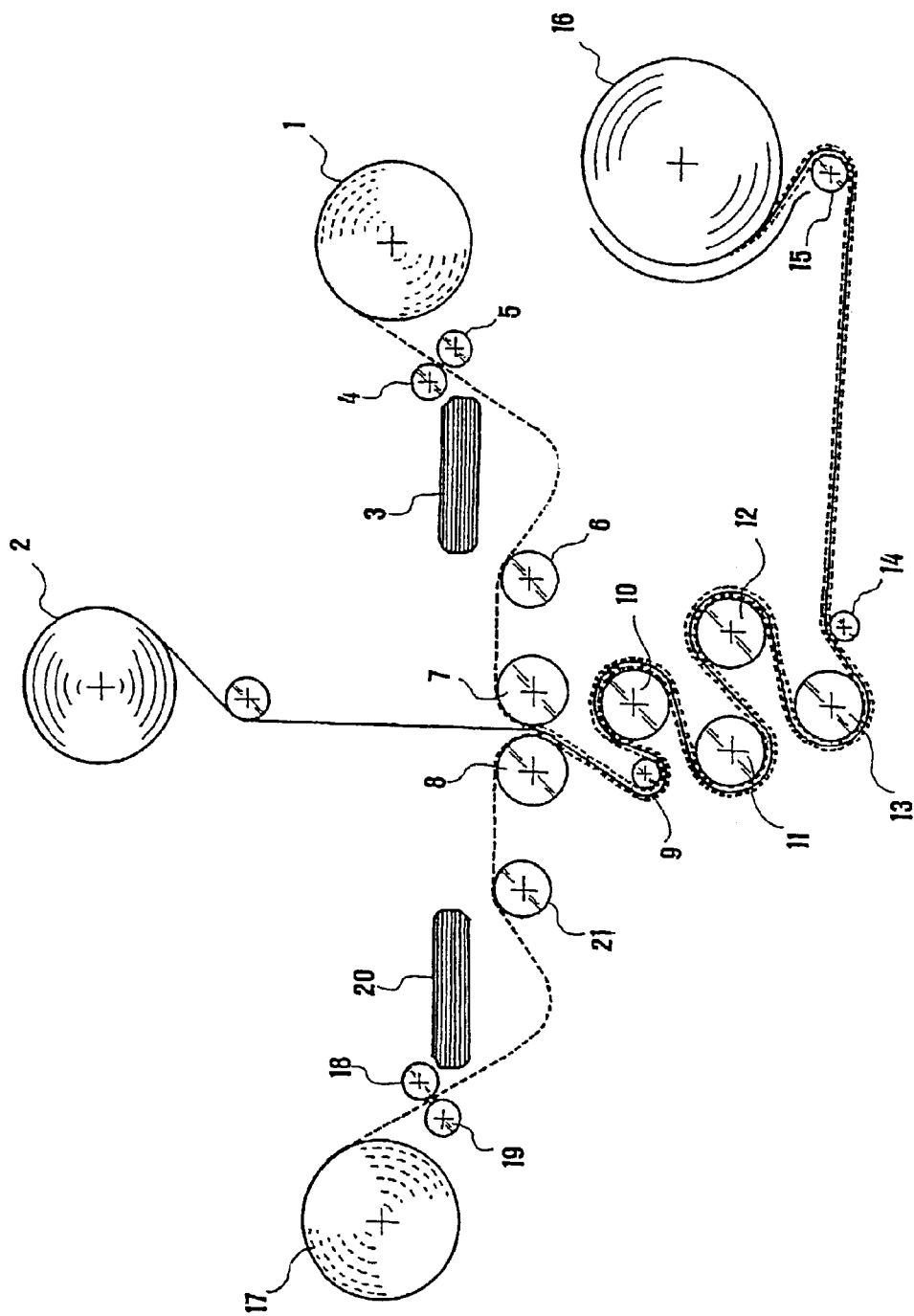

FIG. 2 illustrates a second preferred embodiment of the invention which is a process for the production or a trilayer composite film which is formed by pressing a single layer or PET carrier film between two films of a PVB safety film. The elements illustrated denoted by the numerals 1 to 16 are identical with those described in relation to FIG. 1. The processes illustrated in FIG. 2 additionally require the provision of a second feed roller 17, a pair of pinch rollers 18 and 19, an infra red heater 20 and a spiral roll 21. The second film of PVB is drawn from feed roller 17 by the action of pinch rollers 18 and 19. The temperature of the PVB film is raised as it passes in front of infra red heater 20. The hot film passes aver spiral roller 21 and is fed to nip rollers 7 and 8 The spiral roller 21 is operated so as to avoid any stretching of the PVB during its passage from pinch rollers 18 and 19 to the nip rollers 7 and 8.

The speed of operation of the various rollers is adjusted so as to ensure that the PVB is not under tension as it passes from pinch rollers 4 and 5 to the spiral rollers 6 and 21. The heaters 3 and 20 are operated so as to provide that the temperature of the PVB is in the range 70° C. to 80° C. when it reaches the spiral rollers 6 and 21.

The composite film is wound on collecting roller 16. In a preferred embodiment an interleaving film which may be a polyethylene film may be incorporated onto one surface of the composite film. The provision of such an interleaving layer is particularly valuable when the composite film is a trilayer composite film. The interleaving film prevents the PVB surfaces from becoming bonded together.

The composite films produced by the processes of the invention are useful in the production of laminated glazings especially laminated windscreens for motor vehicles. The composite film is sandwiched between a pair of glass sheets and any excess of film trimmed from the edges of the glass. The film is then degassed using conventional techniques such as nip rolling or vacuum degassing before being heated in an autoclave to produce laminated glazing. The films produced by the processes of this invention have a reduced tendency to wrinkle during this lamination process compared to conventional film.

The invention claimed is:

1. A continuous process for the production of a composite film comprising at least one layer of a flexible polyvinylbutyral safety film together with at least one layer of flexible plastic carrier film, the method comprising:
   drawing said flexible safety film and said flexible carrier film from separate feed rollers,
   heating said flexible safety film to at least a bonding temperature, and
   passing the heated flexible safety film and the flexible carrier film through a pair of nip rollers, thereby pressing the heated flexible safety film and the flexible carrier film together to form the composite film, wherein the heated flexible safety film is not under tension when it is pressed together with the carrier film to form the composite film so as to avoid stretching of the flexible safety film and reduce wrinkling of the composite film during said production process,
   wherein during drawing of said flexible carrier film and pressing the heated flexible safety film and the flexible carrier film together to form the composite film, the flexible carrier film is maintained under tension.

2. A process according to claim 1, wherein the flexible safety film is heated when it is not under tension.

3. A process according to claim 1, wherein the flexible plastic carrier film is polyethylene terephthalate.

4. A process according to claim 3, wherein the polyethylene terephthalate has an infra red reflecting coating on at least one surface.

5. A process according to claim 1, further comprising encapsulating the flexible plastic carrier film in at least two separate films of flexible safety film.

6. A process according to claim 1, wherein a single flexible safety film is pressed with a single flexible carrier film to form the composite film.

7. A process according to claim 1, wherein pressing the heated flexible safety film and the flexible carrier film together comprises passing the heated flexible safety film and the flexible carrier film through a nip roller.

8. A process according to claim 1, wherein
   drawing the flexible safety film comprises drawing first and second flexible safety films from two separate feed rollers,
   heating the flexible safety film comprises heating the first and second flexible safety films, and
   pressing the heated flexible safety film and the flexible carrier film together comprises pressing the flexible carrier film between the first and second flexible safety films, wherein the first and second flexible safety films are not under tension when pressed together with the flexible carrier film to form the composite film.

9. A process according to claim 1, wherein the temperature of the flexible safety film or films at the point at which they are incorporated into the composite film is in the range 30° C. to 120° C.

10. A process according to claim 1, wherein the flexible safety film is heated above the bonding temperature when it is not under tension.

11. A process for production of a laminated glazing comprising at least two sheets of glass having at least one interlayer between them, said interlayer comprising at least one layer of a flexible safety film and at least one layer of a plastic carrier film, the method comprising:

forming a prelaminate assembly comprising said sheets of glass having said interlayer between them and heating said assembly so as to produce a laminated glass product wherein said interlayer has been produced by a process according to claim 1.

\* \* \* \* \*

UNITED STATES PATENT AND TRADEMARK OFFICE
CERTIFICATE OF CORRECTION

| | | |
|---|---|---|
| PATENT NO. | : 7,503,994 B2 | Page 1 of 1 |
| APPLICATION NO. | : 10/380621 | |
| DATED | : March 17, 2009 | |
| INVENTOR(S) | : Litterio Bolognese et al. | |

It is certified that error appears in the above-identified patent and that said Letters Patent is hereby corrected as shown below:

Title page, item (30) Foreign Application Priority Data should read as follow

October 6, 2000    (EP)  …………..00830656.5

Signed and Sealed this

Twenty-first Day of July, 2009

JOHN DOLL
*Acting Director of the United States Patent and Trademark Office*